Sept. 4, 1945.    A. F. PRANGE    2,383,943
GRINDER OR TURNING LATHE DOG
Filed Nov. 8, 1943
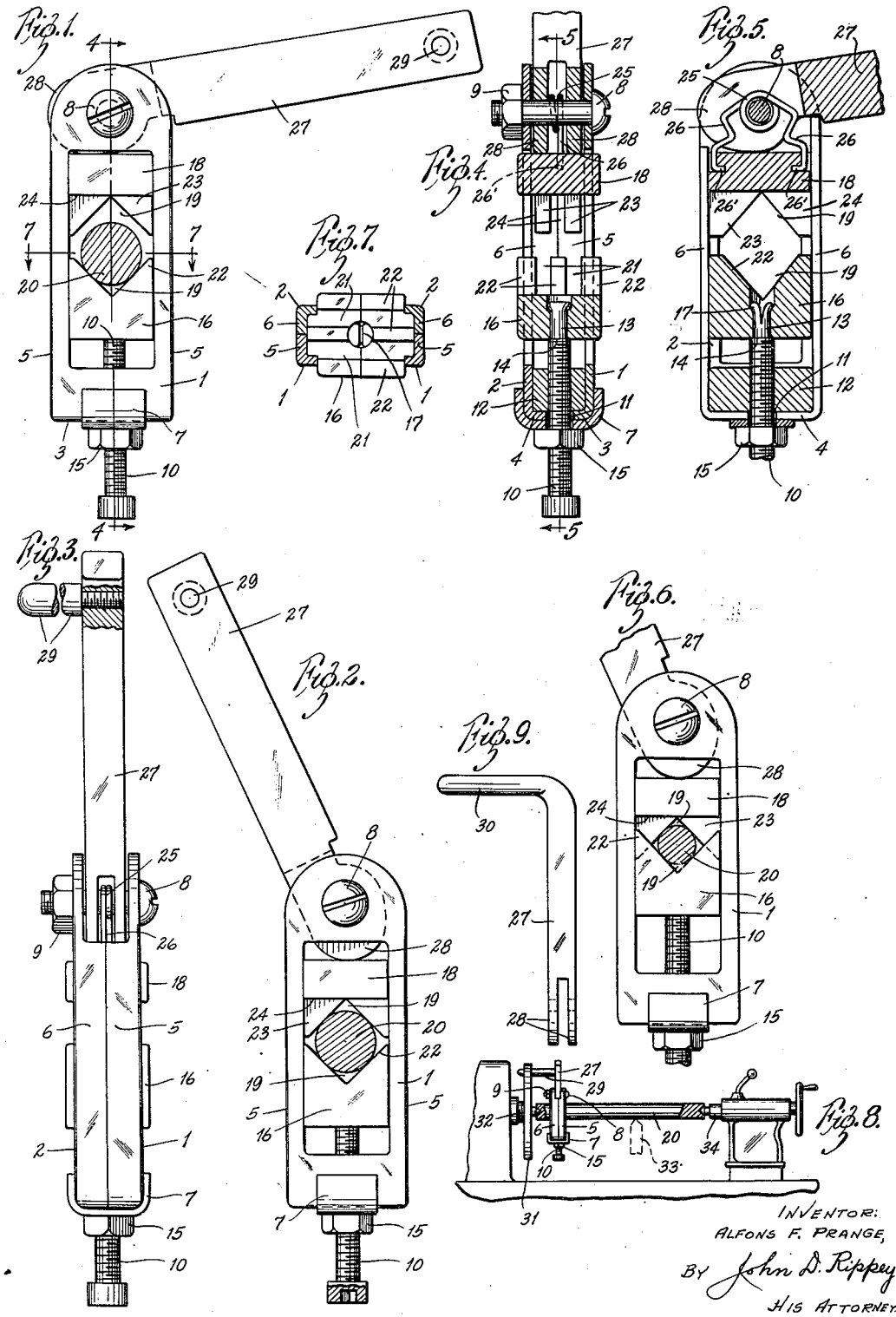
INVENTOR:
ALFONS F. PRANGE,
BY John D. Rippey
HIS ATTORNEY Patented Sept. 4, 1945

2,383,943

UNITED STATES PATENT OFFICE 2,383,943

GRINDER OR TURNING LATHE DOG

Alfons F. Prange, St. Louis, Mo.

Application November 8, 1943, Serial No. 509,385

3 Claims. (Cl. 82—42)

This invention relates to devices sometimes called grinder or turning dogs, for use in grinders and in turning lathes; and it has special reference to devices for attachment to the articles or work pieces being ground or turned and for engaging the face plate or dog plate of the grinder or lathe to hold the articles or work pieces in fixed positions while they are being ground, shaped, or otherwise treated and processed.

Objects of the invention are to provide a device, sometimes generally known and designated as a grinder or turning dog, comprising a frame supporting a movable clamping block and a cooperating clamping member for clampingly engaging different articles or work pieces of different respective sizes or dimensions; to provide a manually operative mechanism in said frame for holding said block rigidly clamped upon the articles or work pieces extending into said frame between said block and said member, and thereby preventing said article or work from displacement in any direction; to provide means in connection with said mechanism for engaging the face plate or dog plate of the grinder or turning machine to hold said device in fixed position in said machine, in order to prevent said mechanism from becoming displaced or loosened upon, from, or relative to the articles or work pieces engaged between said block and said member; and to arrange said device in a symmetrical form in order to constitute a balance or equipoise for the device and to distribute the weight in suitable nearly equal ratios or proportions at opposite sides of the articles or work pieces engaged thereby.

Another object of the invention is to provide a device, sometimes known as a grinder or turning dog, composed of a frame supporting two relatively movable blocks or members separated by a space for receiving one end portion of the articles or work pieces to be operated upon by a grinding machine or turning lathe, means for adjusting said clamping members and holding the same rigidly in different selected positions in said frame, manual mechanism for actuating said clamping block in a direction to clamp upon the articles or work pieces extending into said space between said block and said member, associated with means for releasing the block from clamping engagement upon said articles or work pieces when said mechanism is properly operated for that purpose, and to provide means in connection with said mechanism for engaging the usual or a special face plate or dog plate of the grinding machine or turning lathe in a manner to hold said mechanism in a position in which said block and said member rigidly clamp upon and hold the articles or work pieces during operation of the machine and to prevent displacement of the articles or pieces during processing thereof.

Another object of the invention is to provide a grinder or turning dog that may be speedily attached to and detached from any articles or work pieces to be engaged thereby without the use of separate wrenches or other instruments, and having means for effecting said attachment and also for engaging the face plate or dog plate of the grinding machine or lathe to prevent displacement of any of the parts during operation of said machine or lathe.

Various other objects will be apparent from the following description, reference being made to the annexed drawing, in which—

Fig. 1 is a side elevation of the device constituting my improved grinder or turning dog in released or unclamped position upon the article or work extending between the clamping block and clamping member.

Fig. 2 is a similar side elevation of said grinder or turning dog device showing the parts in the positions they occupy when the clamping block and clamping member are clamped upon an article or work piece.

Fig. 3 is a side edge elevation of the device at 90° from that shown in Fig. 2, that is, looking at the left hand side of Fig. 2, a part of the operating mechanism being shown in section.

Fig. 4 is a longitudinal sectional view on the line 4—4 of Fig. 1.

Fig. 5 is a longitudinal sectional view at right angles to the section of Fig. 4 and on the line 5—5 of Fig. 4.

Fig. 6 is a side elevation similar to Fig. 2, showing an article or work piece of relatively small diameter or dimensions engaged and clamped between the clamping block and clamping member.

Fig. 7 is a sectional view on the line 7—7 of Fig. 1.

Fig. 8 is a reduced view showing my improved grinder or turning dog device mounted in a grinder or turning lathe and rigidly holding an article or work piece from displacement.

Fig. 9 is a side elevation of a unitary or one-piece cam lever for operating the clamping block.

In the embodiment and suggested modification of the invention chosen for illustration, the frame of the device is composed of two duplicate metallic frame parts 1 and 2 having abutting flanges 3 and 4 along their lower ends, and abutting flanges 5 and 6 along their longitudinal sides.

These abutting flanges hold the frames 1 and 2 spread apart, and prevent said frames from restricting the free movement of the clamping block and clamping member that are mounted in the frame. The lower end of the two frame parts are held together by a bracket 7. The upper ends of the two frame parts are held together by an axle screw or pivot 8 having a nut 9 detachably screwed on one end thereof. When the nut 9 is detached from the axle screw 8, the latter may be removed, and, when the bracket 7 is detached from the opposite end of the frame, the parts 1 and 2 may be separated and the entire device may be dismantled, repaired, new parts substituted for any parts that have been damaged, and reassembled.

A combined adapter, adjuster and holder device, consisting of a rod 10, extends through a hole 11 in the bracket 7 and in the lower end flanges 3 and 4 of the frame, and is screwed through a block 12 detachably mounted in the lower end of the frame between the parts 1 and 2. The upper end of the rod 10 has a reduced unthreaded extension 13 integrally united with the end of the rod 10 at an annular shoulder 14. The rod 10 is provided with screwthreads which extend only to the shoulder 14, leaving the reduced extension 13 unthreaded. The block 12 is clampingly engaged between the frame parts 1 and 2, which clamping engagement substantially reduces or prevents sliding movement of said block 12 away from the flanges 3 and 4. As a consequence, when the rod 10 is rotated, it is screwed through the block 12 and thereby moved longitudinally. A lock nut 15 screwed on the rod 10 below the bracket 7 may be rotated relative to said rod and thereby screwed into clamping engagement with the bracket 7. When so adjusted, said nut 15 cooperates with the block 12 which clampingly engages the flanges 3 and 4 to hold the rod 10 from accidental rotation and from longitudinal movement and displacement. That is, by cooperation of the block 12 and lock nut 15, the rod 10 may be positively locked in any of its longitudinally adjusted positions. The upper unthreaded extension 13 of the rod 10 extends pivotally into a hole in the vertical axis of a clamping member 16 mounted for sliding movements to different adjusted positions in the frame 1—2 above the block 12. The clamping member 16 seats upon the shoulder 14. The extension 13 has a flared upper end 17 to prevent detachment of the rod 10 and member 16 from each other and still leave the rod freely rotative relative to said member for longitudinal movements by the screwthreaded engagement of said rod in the block 12. The member 16 is held from lateral displacement and from turning by interengagement with the frame parts 1 and 2 and the flanges 5 and 6. When the lock nut 15 is loosened, the rod 10 may be turned in one direction to move the member 16 upwardly, or may be turned in the opposite direction to move said member 16 downwardly, as desired. Said member 16 will be firmly and rigidly retained in any adjustment to which it is moved when the lock nut 15 is screwed along said rod and clamped against the bracket 7.

A cooperating clamping block 18 is movably mounted in the upper end of the frame comprising the parts 1 and 2 and the abutting flanges 5 and 6. The clamping member 16 and cooperating clamping block 18 are provided with complementary oppositely disposed V-shaped notches 19, forming a space between said member and said block into which the articles or work pieces 20 may be extended for clamping engagement. The member 16 is provided with a number of grooves 21 separating a series of arms 22, and the block 18 is provided with a series of arms 23 and grooves 24 complementary to the grooves 21 and arms 22, respectively. That is, when the member 16 and block 18 are moved toward each other, the arms 22 on the member 16 may enter the grooves 24 in the block 18 while the grooves 21 in said member 16 receive the arms 23 on said block 18. This permits the two clamping elements 16 and 18 to be moved to telescoping or overlapping positions, as shown in Fig. 6, to clamp upon a small article or work piece, and also permits adjustment of said elements to a position to clamp upon larger articles or work pieces, as shown in Fig. 2.

An elastic and resilient connecting device attaches the block 18 to the axle 8, and functions to support said block 18 in its upper position away from the member 16, to move said block 18 away from said member 16, and to yield when the manually operative mechanism for actuating the block 18 to clamp upon the articles or work pieces 20 is operated. As shown, said connecting device may consist of a spring coil 25 through which the axle 8 extends and having extended resilient arms 26 formed with projections 26' detachably engaging the block 18. The arms 26 operate to move the block 18 upwardly in a direction away from the member 16.

The manually operative mechanism for moving the block 18 in opposition to the spring 25—26 and to clamp said block 18 upon the articles or work pieces 20, comprises a lever 27 extending into the upper end of the frame between the frame members 1 and 2 and formed with a cam 28 operating against the upper end of the block 18. When the low side of the cam is against the block 18, said block is held in its upper position away from the block 16 by the spring arms 26, as indicated in Figs. 1 and 5. When the lever 27 is moved to operate higher sides of the cam 28 against the block 18, said block is moved in opposition to the spring arms 26 toward the block 16 and to a position to clamp upon the articles or work pieces 20, as shown in Figs. 2 and 6. If the articles or work pieces 20 are relatively large, they will be clamped between the blocks before the arms 22 and 24 of said blocks overlap. But, when smaller articles or work pieces 20 are clampingly engaged between said blocks, the arms 22 and 23 do overlap, as indicated in Fig. 6. The lever arm 27 may be provided with a detachable handle 29; or the outer end of said lever arm 27 may be bent laterally to form an integral handle 30, as shown in the modification of Fig. 9. The handles 29 and 30 also function to engage and interlock with the usual or any special face plate or dog plate 31 attached to the rotary part 32 of the grinder or turning lathe, and thereby positively turn the articles or work pieces 20 for action of the grinder or tool 33.

In use, the device is attached to the articles or work pieces 20 by extending the latter between the member 16 and block 18 and into the notches 19. The member 16 may be adjusted in proper position for an article or work piece of known size by operation of the adapter, adjuster and holder device 10, and secured in such position by tightening the lock nut 15. After the article or work piece has been extended between the clamping elements 16 and 18 and into the notches 19, the operating mechanism, consisting of the lever arm 27, may be moved to operate the cam 28 and thereby force the block 18 into clamping engagement against said article or work. Then, the article or work may be mounted in the grinder or lathe in the usual manner, as should be understood by reference to Fig. 8, and the handle 29 or the handle 30 engaged in the complementary notch or opening in the face plate or dog plate 31. After the part 34 of the grinder or lathe has been tightened to hold the work, said grinder or lathe may be operated without possibility of the article or work becoming displaced. In the embodiment shown, the member 16 and the parts below the same substantially balance and constitute an equipoise for the block 18 and the parts above and cooperating therewith. This balance or equipoise substantially minimizes the detractions of centrifugal force during rotation of the work in the grinder or turning machine. No wrenches or other separate tools or appliances are required for firmly and rigidly engaging the article or work with the device, nor for detaching the device from the article or work after processing has been completed. As a consequence, much loss of time is avoided.

The device may be varied in various particulars other than those specifically mentioned without departure from the nature and principle of the invention. I contemplate such variations as may be needed from time to time.

What I claim and desire to secure by Letters Patent is:

1. A device of the character described comprising two separable duplicate metallic parts forming a frame, a supporting device engaging and holding one end of said parts in rigid relationship to form said frame, a clamping member adjustably supported in said frame by said device, a pivot holding the opposite ends of said parts in rigid relationship to form said frame, a clamping block supported in said frame for sliding movements toward and from said member, a cam lever supported for swinging movements on said pivot for holding said clamping block clamped against an article extending between said member and said block, and a spring connecting said block with said pivot for moving said block away from said clamping member to release said article.

2. A device of the character described comprising two duplicate metallic frame parts, abutting flanges along the lower ends and longitudinal sides of said parts holding said parts spaced from each other, a bracket holding the lower ends of said parts in a position to form an open frame in which said flanges abut against each other, a block seated between said frame parts and on said flanges at the lower ends of said frame parts and having a screwthreaded hole therethrough, a rod extending through said bracket and through said lower end flanges and having screwthreaded engagement in said hole in said block for longitudinal movements, a clamping member mounted for sliding movements between said flanges on the sides of said respective parts and having swivel connection with said rod for movement thereby to different adjusted positions in and along said frame, a pivot extending through the opposite ends of said parts from said bracket and holding said ends of said parts in rigid relationship to form said frame, a clamping block mounted in the upper end of said frame for sliding movements toward and from said clamping member, an actuator supported by said pivot for moving said clamping block in a direction away from said clamping member, and a device mounted for swinging movements on said pivot for positively moving said clamping block toward said clamping member in opposition to said actuator.

3. A device of the character described comprising two duplicate metallic frame parts having abutting side and end flanges holding said parts spaced from each other to form an open frame, a block mounted between said parts on said end flanges and between said side flanges at the lower end of said frame and having a screwthreaded hole therethrough, a bracket holding said parts in a position in which said flanges abut against each other, a screwthreaded rod extending through said bracket and said end flanges and having screwthreaded engagement in said hole in said block for longitudinal movements, a clamping member mounted for sliding movements between said frame parts and said side flanges and having swivel connection with the upper end of said rod for movement thereby to different adjusted positions in and along said frame, a pivot extending through and holding the opposite ends of said bracket in rigid relationship to form said frame, a clamping block mounted between said pivot and said clamping member for sliding movements in said frame, a spring supported by said pivot for moving said clamping block in a direction away from said clamping member toward said pivot, and a manipulative device mounted on said pivot for positively moving said clamping block toward said clamping member in opposition to said actuator.

ALFONS F. PRANGE.